(12) United States Patent
Kawara

(10) Patent No.: US 9,619,440 B2
(45) Date of Patent: Apr. 11, 2017

(54) DOCUMENT CONVERSION APPARATUS

(71) Applicant: CANON KABUSHIKI KAISHA, Tokyo (JP)

(72) Inventor: Satoshi Kawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 83 days.

(21) Appl. No.: 14/276,143

(22) Filed: May 13, 2014

(65) Prior Publication Data
US 2014/0344669 A1 Nov. 20, 2014

(30) Foreign Application Priority Data
May 15, 2013 (JP) .................................. 2013-103204

(51) Int. Cl.
G06F 17/00 (2006.01)
G06F 17/21 (2006.01)
G06F 17/22 (2006.01)

(52) U.S. Cl.
CPC ........ G06F 17/214 (2013.01); G06F 17/2264 (2013.01)

(58) Field of Classification Search
CPC .......................... G06F 17/214; G06F 17/30905
See application file for complete search history.

(56) References Cited

U.S. PATENT DOCUMENTS

| 7,570,374 | B2 | 8/2009 | Kawara | |
|---|---|---|---|---|
| 8,166,117 | B2* | 4/2012 | Sundstrom | G06F 17/2217 709/206 |
| 2002/0159084 | A1* | 10/2002 | Daniels | G06F 17/214 358/1.11 |
| 2005/0105118 | A1* | 5/2005 | Yoshida | G06F 3/1208 358/1.13 |
| 2005/0240393 | A1* | 10/2005 | Glosson | G06F 17/24 704/8 |
| 2005/0270553 | A1 | 12/2005 | Kawara | |
| 2008/0079730 | A1* | 4/2008 | Zhang | G06F 17/2217 345/468 |
| 2008/0304113 | A1* | 12/2008 | Curry | G06F 17/214 358/426.12 |
| 2010/0218086 | A1* | 8/2010 | Howell | G06F 17/214 715/236 |
| 2011/0090230 | A1* | 4/2011 | Bacus | G06F 17/214 345/467 |

(Continued)

FOREIGN PATENT DOCUMENTS

JP 2005-332088 A 12/2005

Primary Examiner — Scott Baderman
Assistant Examiner — Howard Cortes
(74) Attorney, Agent, or Firm — Fitzpatrick, Cella, Harper & Scinto

(57) ABSTRACT

A document conversion apparatus includes an obtaining unit configured to obtain document data in a first file format including first character font information; and a conversion unit configured to convert the obtained document data into document data in a second file format that is different from the first file format using second character font information that is different from the first character font information, wherein the conversion unit includes alternative information, showing that the second character font information is an alternative of the first character font information, in the document data in the second file format.

12 Claims, 9 Drawing Sheets

(56) References Cited

U.S. PATENT DOCUMENTS

| | | | |
|---|---|---|---|
| 2011/0093565 A1* | 4/2011 | Bacus | G06F 17/30905 709/219 |
| 2011/0216367 A1* | 9/2011 | Cohen | G06F 3/1208 358/1.15 |
| 2013/0027730 A1* | 1/2013 | Taira | G06F 3/1211 358/1.13 |
| 2013/0326348 A1* | 12/2013 | Ip | G06F 17/214 715/269 |
| 2014/0059072 A1 | 2/2014 | Kawara | |
| 2014/0108897 A1* | 4/2014 | Boutelle | G06F 17/227 715/201 |

* cited by examiner

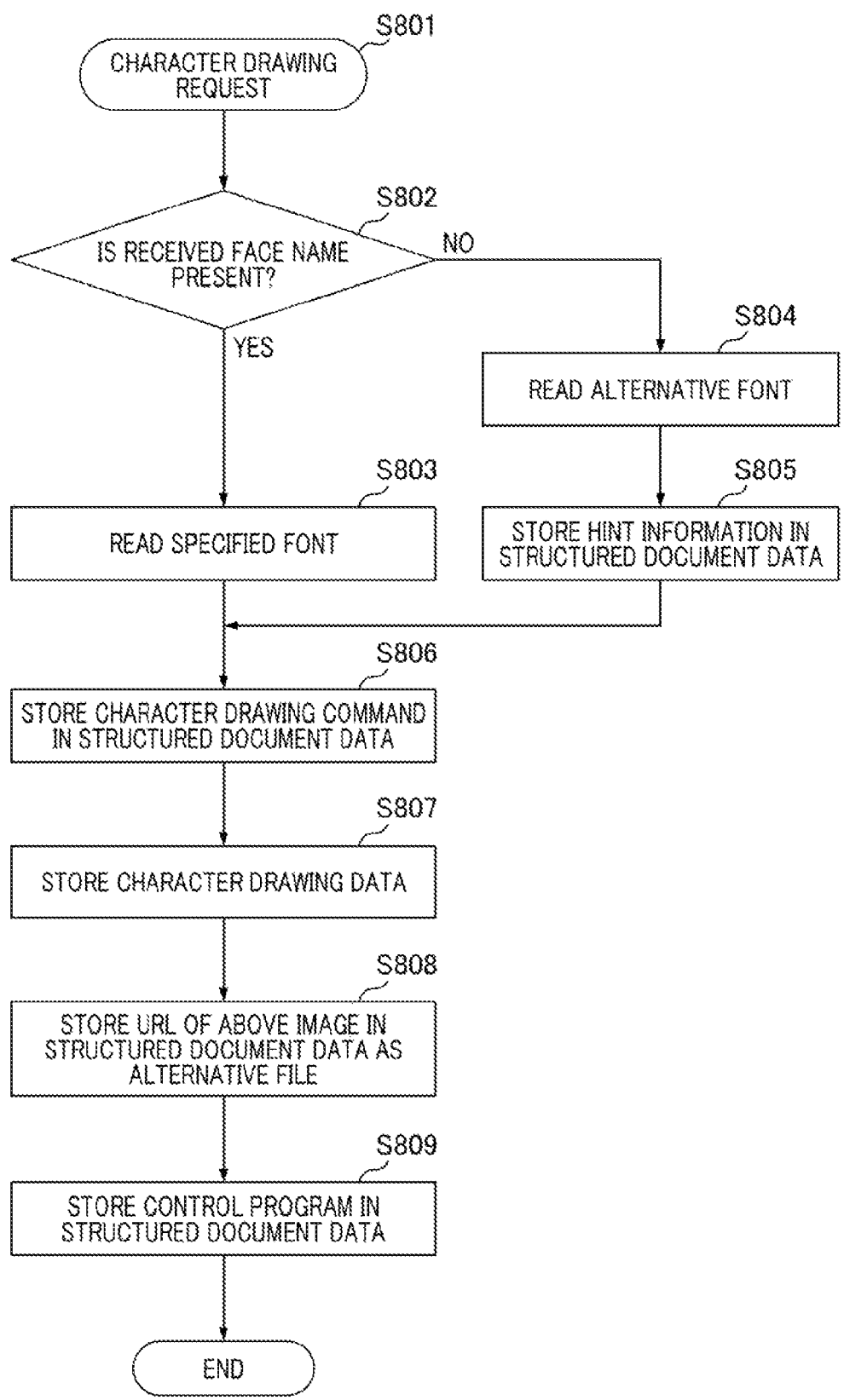

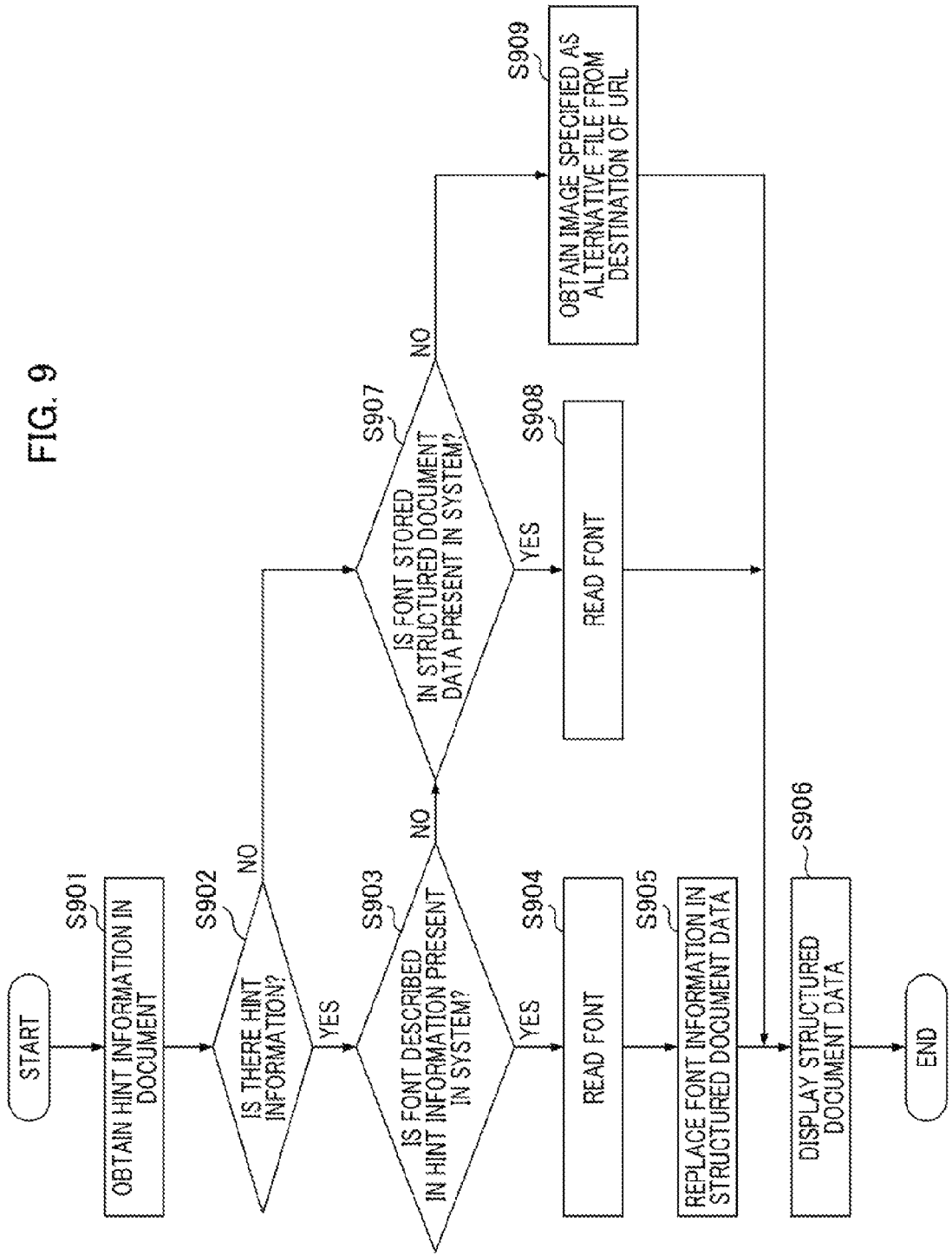

FIG. 10

```
···Data omitted···

10-1 {
Obj1
<<
/Type Hint
/FontB
/Original Font FontA
>>

10-2 {
Obj2
<<
/Type Page
/Alternative Contents [obj4]
/Resource Font[obj3]
/Contents
Stream
BT
/FB 48
(ABC)
ET
endStream
>>

10-3 {
Obj3
<<
/Type Font
/SubType TrueType
/Name FB
/BaseFont FontB
~Font information~
>>

10-4 {
Obj4
<<
/Type Alternative
Stream
Http://www.xxx.xxx.xxx.jpg
EndStream
>>

Obj5
<<
~Program~
>>
···Data omitted···
```

FIG. 11

```
···Data omitted···

Obj1
<<
/Type Hint
/FontB
/Original Font FontA
>>

Obj2
<<
/Type Page
/Alternative Contents [obj4]
/Resource Font[obj3]
/Contents
Stream
BT
/FB 48 Tf
(ABC) Tj
ED
endStream
>>

Obj3
<<
/Type Font
/SubType TrueType
/Name FB
/BaseFont FontB
~Font information~
>>

Obj4
<<
/Type Alternative
Stream
Http://www.xxx.xxx.xxx.jpg
EndStream
>>

···Data omitted···
```

DOCUMENT CONVERSION APPARATUS

BACKGROUND OF THE INVENTION

Field of the Invention

The present invention relates to a technology for converting the format of document data.

Conventionally, there is a system which converts any electronic document data into structured document data represented by the portable document format (PDF). For example, there is a conversion system that uploads electronic document data from a client terminal to a server terminal, converts the data to structured document data by the server terminal, and returns (sends) the structured document data after conversion to the client terminal (or another specified client terminal). In such a conversion system, in order to reduce the network load, the data size of the structured document data after conversion needs to be reduced to the utmost. As one example thereof, among character font information constituting structured document data, glyph information (which is the information representing the form of a character, and also simply referred to as a "glyph") having a relatively large data size is generally excluded from the structured document data. However, the structured document data generated in this way has a problem in that due to the difference in character font information included in a client terminal and a server terminal, when the structured document data is browsed, the characters in the structured document data cannot be displayed in the intended form in some cases.

Japanese Patent Laid-Open No. 2005-332088 is disclosed in order to display the characters in structured document data after conversion in the intended form. With the technology of Japanese Patent Laid-Open No. 2005-332088, when structured document data is generated, the language information on the character font of a browsing destination is obtained, and the language information is compared with the language information on the character font included in the electronic document data. Then, when the language types in the both language information are matched, a structured document excluding a glyph from the files is generated, but, when the language types are not matched, structured document data including a glyph in the character font information is generated. Accordingly, a structured document can be generated having both of readability and reduced file size depending on a browsing environment.

However, since there has been an unspecified large number of browsing environments due to the cloud service and the like in recent years, it is not realistic to obtain the information about the browsing environment of each browsing destination and compare it when electronic document data is converted into structured document data as in Japanese Patent Laid-Open No. 2005-332088. Therefore, there is a demand to generate structured document data without obtaining the information on the browsing environment of a browsing destination in advance.

In addition, it is desirable that character font information be stored in structured document data for browsing, and that the character font information stored in the generated structured document data be the character font information stored in the electronic document data of a conversion source. However, when the character font information stored in the electronic document data of a conversion source cannot be obtained in a server terminal that performs conversion, other character font information that is different from the character font information stored in the electronic document data of a conversion source will be stored in the structured document data. Therefore, even when the character font information stored in the electronic document data of a conversion source exists in the browsing environment of a browsing destination, character font information that is different from that character font information will be stored in the generated structured document data. As the result, the structured document data will be browsed in a character font that is different from the character font of the electronic document data of a conversion source.

SUMMARY OF THE INVENTION

According to one aspect of the present invention, an apparatus is provided which can convert electronic document data into structured document data independently from the character font information included in respective apparatuses used when electronic document data is converted into structured document data and when the structured document after conversion is browsed.

According to one aspect of the present invention, there is provided a document conversion apparatus comprising: an obtaining unit configured to obtain document data in a first file format including first character font information; and a conversion unit configured to convert the obtained document data into document data in a second file format that is different from the first file format using second character font information that is different from the first character font information, wherein the conversion unit includes alternative information, showing that the second character font information is an alternative of the first character font information, in the document data in the second file format.

Further features of the present invention will become apparent from the following description of exemplary embodiments (with reference to the attached drawings).

BRIEF DESCRIPTION OF THE DRAWINGS

FIG. 8 is a flowchart showing a series of flow of conversion processing into structured document data.

FIG. 9 is a flowchart showing a series of flow for displaying a structured document based on a control program stored in structured document data.

FIG. 10 is a schematic diagram of the information included in structured document data according to a first embodiment.

FIG. 11 is a schematic diagram of the information included in structured document data according to a second embodiment.

DESCRIPTION OF THE EMBODIMENTS

Hereinafter, preferred embodiments of the present invention will be described with reference to the attached drawings.

(First Embodiment)

Figure 1:
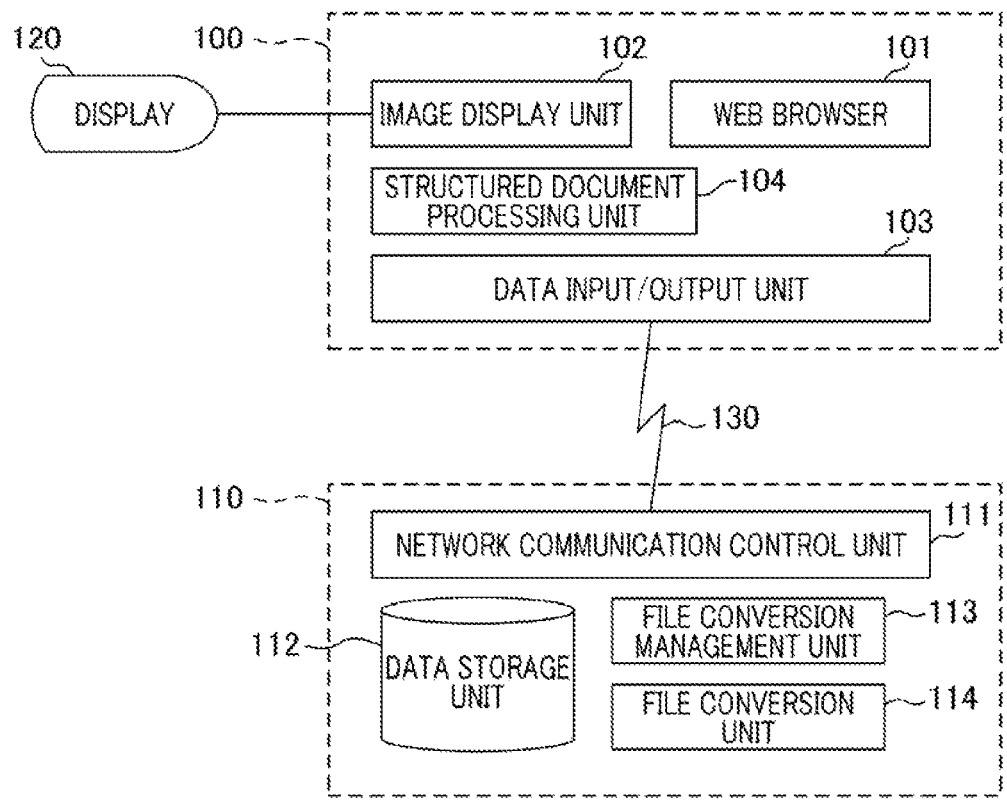
FIG. 1 is a schematic diagram of the entire system according to one embodiment.

First, the entire system configuration according to a first embodiment will be described. FIG. 1 is a schematic diagram of the entire system according to the present embodiment. In the present embodiment, one client terminal and one server terminal are employed, but the number of each terminal is not limited to one, and a plurality of terminals may be used. A client terminal 100 is an information processing apparatus such as a personal computer, which includes a Web browser 101, an image display unit 102, a data input/output unit 103, and a structured document processing unit 104. In addition, a server terminal 110 is a Web server that supports at least HTTP and FTP, and is also an information processing apparatus such as a personal computer similar to the client terminal 100. The server terminal 110 includes a network communication control unit 111, a data storage unit 112, a file conversion management unit 113, and a file conversion unit 114.

The Web browser 101 can display an HTML document received from the server terminal 110. In addition, when a program for inputting data on a screen is included in the displayed HTML document data, a user can input data into the input field. Further, it may include a program for sending the data input by the user to the server terminal 110. When the user performs an operation according to the program, the input data is sent to the server terminal 110. Note that these programs are supported by, for example, generally available Web browsers. In addition, the Web browser 101 displays a HTML document received from the server terminal 110 through the data input/output unit 103 on a display 120 through the image display unit 102. The data input/output unit 103 communicates with the server terminal 110 and exchanges data and the like through a network 130. The form of the network 130 may be a telephone line, a LAN, the Internet, a wireless network, or any other network that meet the communication protocol for a Web environment.

A structured document processing unit 104 analyzes structured document data and displays the data on the display 120 through the image display unit 103. Note that, when a HTML document received from the server terminal 110 is structured document data, the structured document processing unit 104 has a function that displays the document on the display 120 not through the Web browser 101 but through the structured document processing unit 104.

The server terminal 110 receives data and a conversion instruction from the Web browser 101. According to the received conversion instruction, for example, electronic document data (first document data) is converted to structured document data (second document data), and the structured document data after conversion is returned to the Web browser 101, or sent to another specified client (not shown). At this time, a HTML document is programmed so that, when a user uses a button for input through the Web browser 101, the result is sent to the server terminal 110. According to that program, the Web browser 101 displays a button, and, when a user performs an operation such as pressing down the button in the Web browser 101, and data or a conversion instruction is sent to the server terminal 110. The server terminal 110 analyzes the received data based on the HTML document sent to the client terminal 100, and responds to the Web browser 101 as needed.

Figure 5:
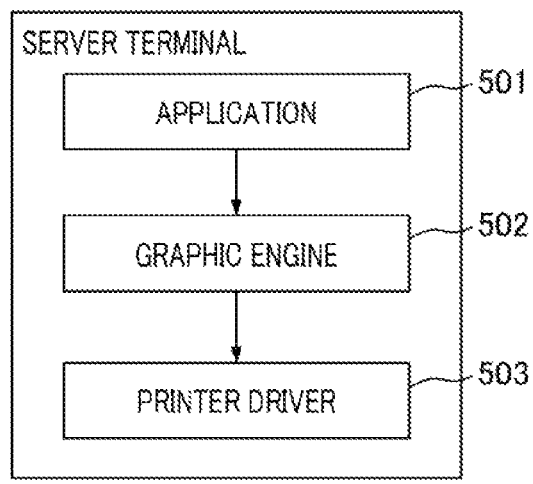
FIG. 5 is a representative functional block diagram of a print control apparatus.

The network communication control unit 111 performs the processing for sending or receiving data to/from the client terminal 100 so that the server terminal 110 can function as a Web server. The data storage unit 112 is a database or the like, in which electronic document data that is a conversion target or structured document data after conversion are stored. In the present embodiment, this electronic document data that is a conversion target is the data uploaded from the client terminal 100 through the Web browser 101. However, the electronic document data that is a conversion target is not limited thereto, and may be the data stored in advance. The file conversion management unit 113 determines whether or not there is an application in the server terminal 110 which can convert the electronic document data designated as a conversion target by the client terminal 100. When there is an application that can convert the data, a conversion instruction is issued to the file conversion unit 114. The file conversion unit 114 converts the electronic document data that is a conversion target into structured document data. The file conversion unit 114, as shown in FIG. 5 described below, includes an application 501, a graphic engine 502, and a printer driver 503.

Figure 2:
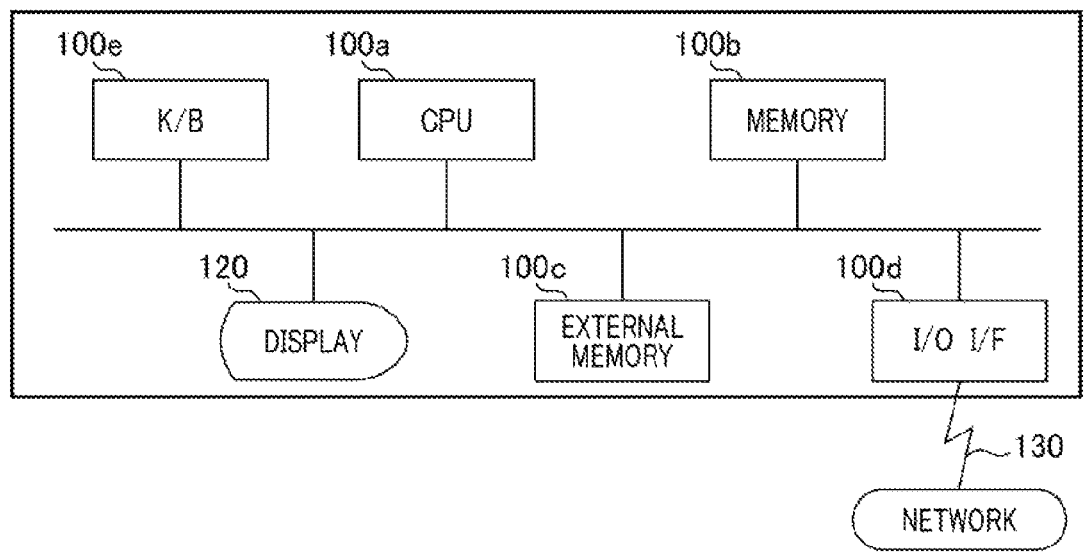
FIG. 2 is a schematic diagram of the configuration according to one embodiment.

Next, referring to FIG. 2, a hardware configuration showing the configuration of an information processing apparatus that can be used as the client terminal 100 and the server terminal 110 will be described. The processing by the client terminal 100 and the server terminal 110 in FIG. 1 is implemented by executing a program stored in a memory 100$b$ by a CPU 100$a$. The program for implementing the processing by the terminals in FIG. 1 is stored in an external memory 100$c$ such as a hard disk or the like. The external memory 100$c$ may employ a removable storage medium such as a floppy disk, a CD-ROM, or the like. In addition, the data storage unit 112 can be implemented as a part of an area on the external memory 100$c$. The display 120 (in the case of the client terminal 100) displays an image, and is connected to the network 130 through an I/O interface 100$d$. In addition, a user uses an input apparatus 100$e$ such as a keyboard, a pointing device, or the like to perform a necessary input.

Figure 3:
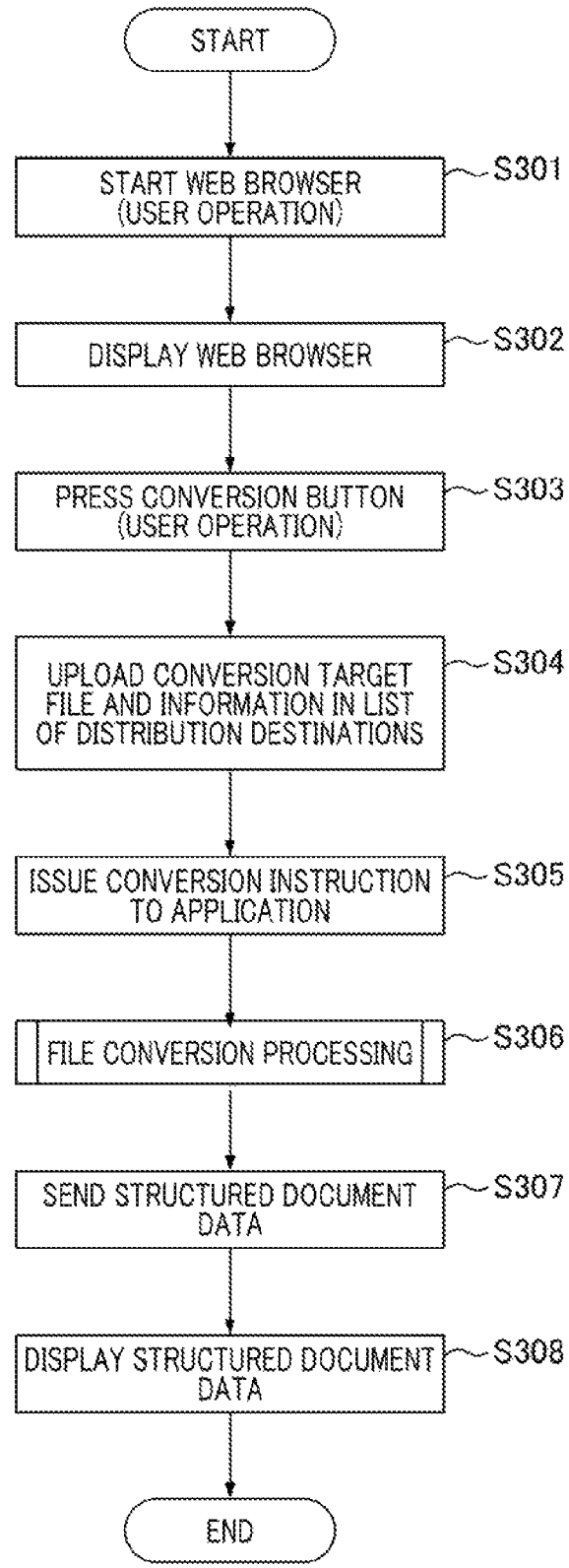
FIG. 3 is a flowchart illustrating the overall processing according to one embodiment.
Figure 4:
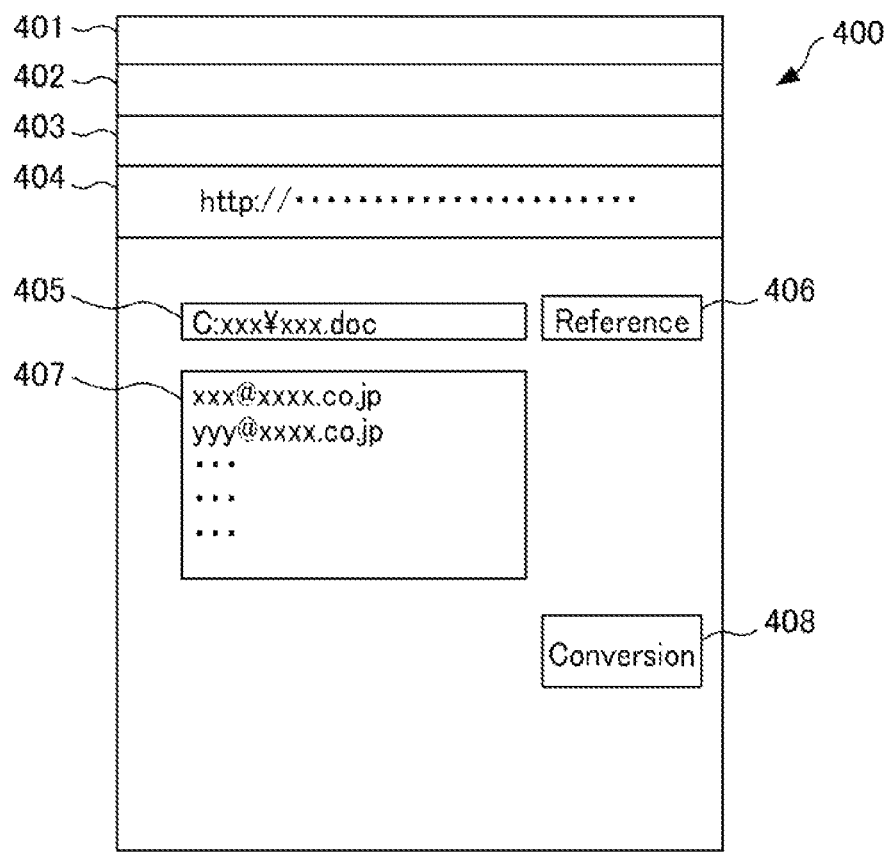
FIG. 4 shows one example of the display screen of a Web browser.

Next, referring to the flowchart in the FIG. 3 and FIG. 4, the processing by a file conversion system will be described. First, in step S301, the Web browser 101 is started on the client terminal 100. This Web browser may be a Web browser that is generally used. FIG. 4 is one example of an HTML document according to the file conversion processing, the document being displayed on the Web browser 101. In FIG. 4, a window 400 is a window of the Web browser 101 displayed on the display 120. A title area 401 displays the title given to a HTML document to be displayed. An area 402 and an area 403 display commands in the form of a tool bar, a button, or the like for printing the content displayed in the Web browser 101, or the like. An area 404 is a URL field for inputting/outputting the address of a Web server to be connected, the URL of a document, and the like. An HTML document is specified by the URL input here. When the Web browser 101 is started, the fields from the title area 401 to the URL field 404 are displayed while the other fields (areas) display the documents specified by the URL preset in a browser.

Next, in step S302, a user inputs the URL of a Web page for performing file conversion processing using the input apparatus 100$e$ such as a keyboard or the like. When the URL is input, an HTML document including a file path input field 405, a reference button 406, a distribution destination selection field 407, and a conversion button 408 is read out from the server and displayed in the window 400. The file path input field 405 is a field in which a user inputs the file path (storage area in the client terminal 100) of electronic document data designated as a conversion target, in which a user can input the file path using the input apparatus 100$e$. In addition, the reference button 406 is a button by which a user can easily select electronic document data as a conversion target. When a user presses down the reference button 406, a dialog box (not shown) is displayed, and electronic document data in the client terminal 100 are displayed as a list. A user inputs the corresponding file path into the file path input field 405 using the input apparatus 100e to designate electronic document data as a conversion target from the data. The distribution destination selection field 407 displays a candidate list of the distribution destinations of structured document data after conversion, and a user uses the input apparatus 100e to designate a distribution destination (a plurality of designations can be designated). In the present embodiment, this candidate list of the distribution destinations is associated with each user in advance, and the candidate list is a list of e-mail addresses. In addition, this HTML document includes the conversion button 408 to start file conversion processing.

Next, in step S303, a user uses the input apparatus 100e to input the file path of the electronic document data that is a conversion target into the file path input field 405, determines a distribution destination by the distribution destination selection field 407, and presses down the conversion button 408. And then, in the present embodiment, the HTML document sent from the server terminal 110 is programmed in advance so that the processing in steps S304 to step S307 described later are executed when the conversion button 408 is pressed down.

First, when the conversion button 408 is pressed down, the Web browser 101, in step S304, uploads the electronic document data designated as a conversion target to the server terminal 110 through a network control unit 111. Further, the information in the list of the selected distribution destinations is reported to the server terminal 110 at the same time.

Next, in step S305, the file conversion management unit 113 issues an conversion instruction for converting the electronic document data to the application for converting the uploaded electronic document data. The application for converting the electronic document data is specified using a function ordinarily built into the basic software (operating system; hereafter referred to as an "OS") included in an apparatus.

Next, in step S306, the file conversion unit 114 that has received the conversion instruction from the file conversion management unit 113 performs processing for converting the electronic document data into structured document data. The structured document data after conversion is stored in the data storage unit 112, and the storage destination is uniquely specified by a URL. The details of this conversion processing will be described later referring to FIG. 6.

Next, in step S307, the server terminal 110 sends the structured document data after conversion to the client terminal 100 through the network control unit 111. In the present embodiment, for simplicity of explanation, the structured document data after conversion is sent to the client terminal 100. However, in practice, the generated data itself is not sent to the client terminal 100, but the URL of the generated structured document data is sent to the client terminal 100, whereby the amount of data sent from the server terminal 110 can be reduced. In addition, the file conversion management unit 113 sends the URL of the structured document data by e-mail to the e-mail addresses in the list of the specified distribution destinations, through the network communication control unit 111.

Next, in step S308, the client terminal 100 analyzes the structured document data received from the server terminal 110 by the structured document processing unit 104, and displays the data on the display 120 through the image display unit 102. Thus, a user can download structured document data to the client terminal 100 using the Web browser 101. Note that, the structured document data can also be obtained from the URL of the structured document data.

Next, the details of step S306 will be described. A method for conversion into structured document data (document conversion method) according to the present embodiment includes a method in which structured document data is obtained by controlling an application for printing through a printer driver. As a conversion unit, a printing function built into the OS of the server terminal 110 in advance is utilized for conversion. FIG. 5 is a more detaned schematic diagram of the file conversion unit 114.

In the server terminal 110, an application software (hereafter referred to as an "application") 501 such as a word processor, a spreadsheet, or the like operates on the OS. When printing is performed by the application 501, the function of the graphic engine 502 among some subsystems provided by the OS is used through the program of the application 501.

The graphic engine 502 performs the processing of image information in, for example, a display and a printer. The graphic engine 502 dynamically links to a module called a "device driver" to reduce the dependency of devices such as a display and a printer, and performs the output processing to respective devices. This module is the printer driver 503.

The printer driver 503 needs to be provided with functions called "Device Driver Interface (DDI)", the implementation of which to a device driver is determined in advance depending on the capability, the functionality, and the like thereof. The graphic engine 502 converts an "Application Programming Interface (API)" call of the application 501 into the data for a device driver. Then, these DDI functions are appropriately called from the graphic engine 502, and the predetermined printing processing is performed. Thus, the graphic engine 502 sequentially processes printing requests from the application 501 through the printer driver 503.

The printer driver 503 can be classified roughly into the printer output system and the file output system according to its use. The printer output system converts a drawing instruction sent from a system through a DDI function into an intermediate format called a "Printer Description Language (PDL)". The intermediate format (PDL) from the printer output system is sent to a printing apparatus equipped with a controller that can process the control command of the PDL, and in this case, printing is performed by the printer driver of a printing apparatus.

On the other hand, the direct purpose of the file output system is not to send data to a printing apparatus, but to convert the drawing instruction sent through a DDI function into the format defined in advance for the structured document data, and to store the data as structured document data on the disk system of a host computer. The general formats of structured document data include the Portable Document Format (PDF), the Scalable Vector Graphics (SVG), and the like. Structured document data is stored in the file system of a host computer.

The above-described DDI functions includes a "job start request" for declaring the start of printing, a "page start request" for declaring the start of a page, a "logic drawing request" for drawing an object like a character, a graphic, or the like programmed in a page, and a "page end request" for declaring the end of a page. When a plurality of pages are printed, the "page start request" and the "page end request" are issued according to the number of pages, and the "logic drawing request" is issued according to the number of objects included in the pages. The printer driver 503 generates a command to each request according to the type of an intermediate format such as the PDL, the PDF, or the like. In the present embodiment, this "printer driver serving as the file output system" is used to convert electronic document data into structured document data.

Figure 6:
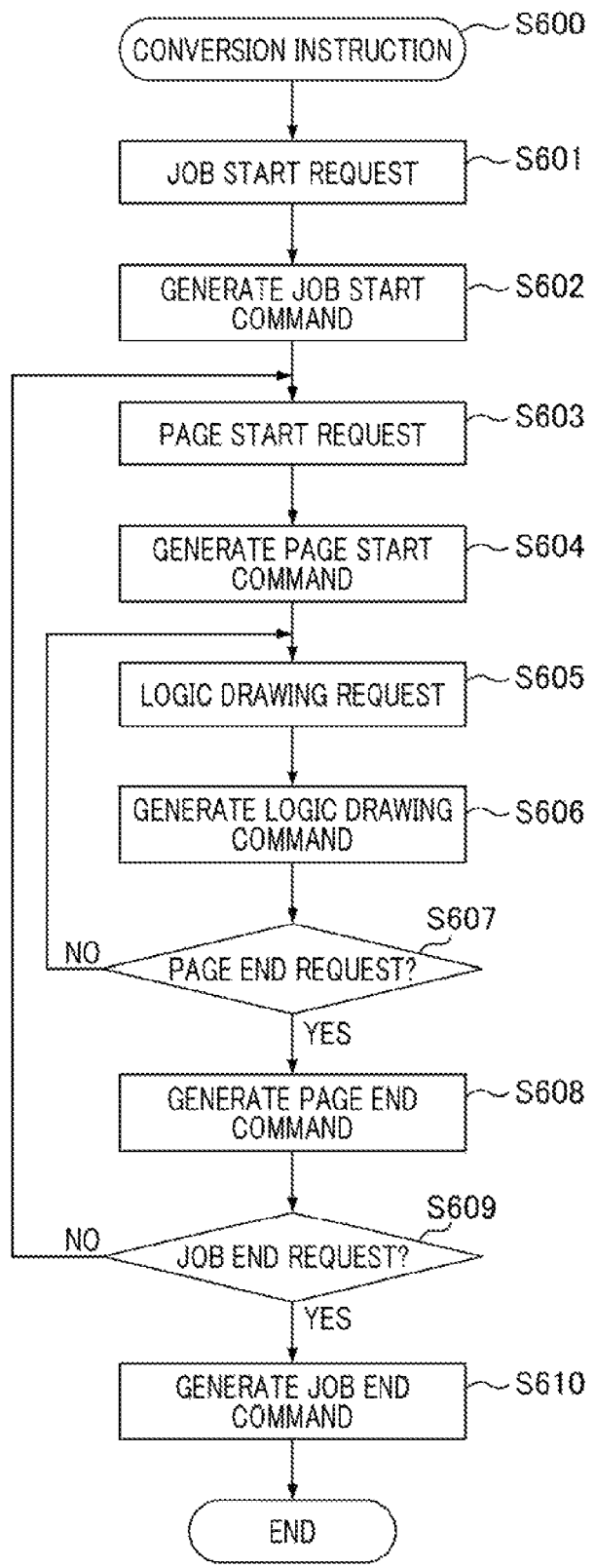
FIG. 6 is a flowchart showing a series of flow of conversion processing.

FIG. 6 is a diagram illustrating the flow of the processing by the application 501, the graphic engine 502, and the printer driver 503 that operate inside the file conversion unit 114. In step S600, the file conversion unit 114 receives a file conversion instruction from the file conversion management unit 113. The file conversion unit 114 that has received the file conversion instruction starts the file conversion by causing the application 501 to send a conversion request for converting the target electronic document data to structured document data to the printer driver 503 through the graphic engine 502.

Next, in step S601, the application 501 sends a conversion request and thereby notifies the start of a conversion job to the graphic engine 502 through a GDI function. The graphic engine 502 converts the notified GDI function into a DDI function, and transfers it to the printer driver 503.

Next, in step S603, the printer driver 503 generates a job start command (step S602), and the application 501 reports the start of a page to the graphic engine 502 through a GDI function. The graphic engine 502 converts the reported GDI function into a DDI function, and transfers it to the printer driver 503.

In step S604, the printer driver 503 generates a page start command. In step S605, the application 501 reports a logic drawing request to the graphic engine 502 through a GDI function, and the graphic engine 502 converts the reported GDI function into a DDI function and transfers it to the printer driver 503. Next, in step S606, the printer driver 503 generates a logic drawing command. The details for the generation of a character drawing command among logic drawing commands will be described later referring to FIG. 8.

Next, in step S607, it is determined whether a request from the application 501 is a page end request or a logic drawing request. When the request from the application 501 is a page end request (YES), the application 501 notifies the end of a page to the graphic engine 502 through a GDI function. The graphic engine 502 converts the notified GDI function into a DDI function and transfers it to the printer driver 503, and the processing proceeds to step S608. Then, in step S608, the printer driver 503 generates a page end command. On the other hand, when the request from the application 501 is a logic drawing request (NO), the processing returns to step S605.

Next, in step S609, it is determined whether a request from the application 501 is a job end request or a page start request. When the request from the application 501 is a job end request (YES), the application 501 reports the end of a job to the graphic engine 502 through a GDI function. Then, the graphic engine 502 converts the reported GDI function into a DDI function and transfers it to the printer driver 503, and the processing proceeds to step S610. In step S610, the printer driver 503 generates a job end command. On the other hand, when the request from the application 501 is a page start request (NO), the processing returns to step S603.

Figure 7:
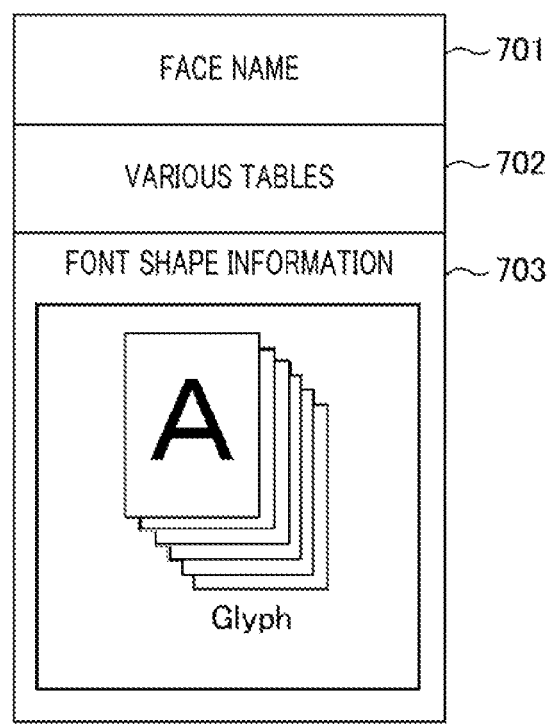
FIG. 7 is a schematic diagram representing the information included in character font information.

Next, a general method for drawing (displaying) a character will be described. FIG. 7 is a schematic diagram illustrating the general information included in character font information. A font face name 701 is the information required for a user to identify the type of a font such as a Gothic type and the like. Various tables 702 include information on the character width of a character font, the mapping information between a character code and the shape of each character font, and the like. Font shape information 703 is the information indicating the drawing shape of a character, and contains therein the drawing shape information (hereafter referred to as a "glyph") on each character.

The formats of character font information can be classified into the bit map font and the outline font, and various formats such as TrueType, OpenType, and the like are defined. Generally, the application 501 achieves a desired character drawing by specifying a font face name, a character code, a drawing attribute(s), and the like. The character code is a code scheme defined in advance, such as ASCII, ShiftJIS, Unicode, and the like, and the drawing attribute is the information on a character size, a drawing position, a color, or the like.

When a character is drawn, a character drawing command included in structured document data is used. In the present embodiment, character drawing commands with a character code, a drawing attribute(s), a font face name, and various tables are included in structured document data. With respect to a glyph, when character drawing is performed, a character is drawn based on the font face name included in a character drawing command and referring to the glyph of the font face name held on the OS of the client terminal 100.

Next, referring to FIGS. 8 to 10, a method for generating a drawing command included in structured document data (the details of step S606) and a method for displaying the structured document data based on the generated drawing command (the details of step S308) will be described.

FIG. 10 is a schematic diagram regarding a drawing command among the information included in structured document data. "Obj1" (10-1) in FIG. 10 shows hint information (the details will be described later), and in the present embodiment, this shows that the font in the structured document data after conversion is "FontB", but the font of the electronic document of a conversion source is "FontA".

"Obj3" (10-3) is information on a character font used in structured document data and "/Name" refers to a font name uniquely used in a structured document. In addition, "/BaseFont" refers to a font face name, and "~Font information~" refers to various tables of a character font.

"Obj2" (10-2) shows the resource of a page in structured document data, and a drawing command. It is shown that the resources are "Obj3", which is "Resource Font" and "Obj4" that is "Alternative Contents", and each "Obj" is referred to. In addition, a drawing command is included in "/Contents". In the present embodiment, "BT" denotes the start of outputting a text character, and it is shown that the font "FB" (i.e. Obj3) is used, the size of the font (a drawing attribute) is "48" points, and the characters ABC (character code) are output. In addition, "ET" denotes the end of outputting the text character.

"Obj4" (10-4) shows a stored alternative file. When the content of "/Contents" described in "Obj2" is ignored, the character image stored in "Obj4" is output.

"Obj5" is a control program (display command), and is executed by a browsing application of the client terminal 100 when structured document data is browsed (displayed) on the client terminal 100. As the programming languages for this control program, JavaScript® and the like may be used, for example. In addition, this control program includes control information on whether or not the content of the above-described "/Contents" is ignored. The details thereof will be described later referring to FIG. 9.

Next, a method for generating a character drawing command will be described referring to FIG. 8. First, in step S801, the application 501 reports a character code, drawing attribute(s), a font face name, and various tables in electronic document data of a conversion source, as a character drawing request in step S600, to the graphic engine 502 through a GDI function. Then, in step S601, the graphic engine 502 converts the reported GDI function into a DDI function and transfers it to the printer driver 503.

Next, in step S802, the printer driver 503 determines whether or not the received font face name is present in (a plurality of) character font information in the server terminal 110 (determination unit). This determination is performed using a function built into the OS of the server terminal 110 in advance (for example, it is implemented by using a function called "EnumFonts"). When the font face name is present in the server terminal 110 (YES), the processing proceeds to step S803. In step S803, the printer driver 503 reads the character font information (first character font information) on the font face name notified in step S801 and present in the server terminal 110. This can be achieved by using a function (for example, a function called "GetFontDate") built into the OS in advance.

On the other hand, when the font face name is not present in the server terminal 110 (NO), the processing proceeds to step S804. In step S804, the printer driver 503 selects character font information that can be an alternative (alternative font information or second character font information) from the other character font information in the client terminal 100 (for example, this is performed by a function called "GetFontData"). Then, the printer driver 503 reads the selected alternative font information.

Next, in step S805, the printer driver 503 stores the hint information that associates the font face name notified in step S801 with the alternative font information selected in step S804 in the structured document data. This means that the reported character font information is replaced with the alternative font information. Specifically, the above-described information of "Obj1" in FIG. 10 is stored in the structured document data.

Next, in step S806, the printer driver 503 generates a character drawing command according to the format of the structured document data using character font information (drawing command generation unit). The character font information used here is the character font information read in step S803 or the alternative font information read in step S804. For example, the information includes a character code, a drawing attribute(s), a font face name, various tables, and the like. The various tables include, as described above, the information on the character width of a character font, the mapping information between a character code and the shape of each character font, and the like. In addition, the generated character drawing command is stored in the structured document data. Specifically, the above-described information of "Obj2" and "Obj3" in FIG. 10 is stored in the structured document data.

Next, in step S807, the printer driver 503 obtains a character code, a drawing attribute(s), a font face name, and a glyph from various tables, performs rendering to generate character image data (image generation unit), and stores the data in the data storage unit 112. The format of the stored character image data may be an image format generally used such as PNG, JPEG, or the like.

Next, in step S808, the printer driver 503 stores the storage destination (for example, the link information such as the URL) of the image stored in step S807 in the structured document data as an alternative file. Specifically, the information corresponding to "Alternative Contents" of the above-described "Obj4" and "Obj2" in FIG. 10 is stored in the structured document data.

Next, in step S809, the printer driver 503 stores a control program (display command) in the structured document data (display command storage unit). Specifically, the above-described information of "Obj5" in FIG. 10 is stored in the structured document data. The control program is executed by a browsing application in a browsing environment when the structured document data is browsed, and the specific explanation will be given referring to FIG. 9 described later. Here, the browsing application may be an application built into a browsing terminal (not shown) in advance for browsing an electronic document. In addition, the character font information stored in the structured document data is the information on a character font except for a glyph (drawing shape information).

Next, referring to FIG. 9, a method for displaying a structured document will be described when the structured document is browsed at a browsing terminal based on the control program in the structured document data. The explanation of the browsing processing corresponds to the details of the processing in step S308 in FIG. 3, and all processing of steps from S901 to S909 are executed in the structured document processing unit 104 of the client terminal 100. In addition, the control program 10-5 includes a program for executing the processing of steps from S901 to S909. Note that a case in which the processing is executed in the client terminal 100 is described here, but when the URL of structured document data is sent by an e-mail in step S307, a terminal that receives the e-mail can also perform the similar processing.

First, in step S901, the hint information in the structured document data ("Obj1" in FIG. 10) is obtained. Next, in step S902, it is determined whether or not there is hint information in "Obj1" in the structured document data (hint information determination unit). This determination of the presence or absence of the hint information is performed by determining whether or not the description "\Type Hint" in FIG. 10 is included in the structured document data.

When there is hint information (YES), the processing proceeds to step S903, and it is determined whether or not the font face name ("FontA" in FIG. 10) of the character font of the electronic document data of a conversion source in "Obj1" is present in the character font information in a browsing terminal. The determination is performed using a function built into the OS of the browsing terminal (for example, this can be achieved by utilizing a function called "EnumFonts").

When the font face name is present in the character font information in the browsing terminal (YES), the processing proceeds to step S904, and the character font information corresponding to the font face name is read (character font information obtaining unit).

Next, in step S905, the character font information in the structured document data is replaced with the corresponding character font information. Specifically, "BaseFont" that is "FontB" in "Obj3" in FIG. 10 is replaced with "FontA" that is the original character font. Further, the various tables of "FontB" stored in "~Font information~" are replaced with the various tables of "FontA" obtained from the browsing terminal. Specifically, "the information on the character width of a character font and the mapping information between a character code and the shape of each character font" of "FontB" is replaced with "the information on the character width of a character font and the mapping information between a character code and the shape of each character font" of "FontA".

Next, in step S906, the glyph of the character font is obtained from the character font information in the browsing terminal, and the data is displayed on a displaying apparatus such as a display (not shown) (document data displaying unit).

On the other hand, when it is determined that there is no hint information (NO) in step S902, or when it is determined that the font face name is not present in the character font information in the browsing terminal (NO) in step S903, the processing proceeds to step S907. In step S907, it is determined whether or not an alternative font stored in the structured document data ("FontB" in FIG. 10) is present in the character font information in the browsing terminal using a function built into the OS of the browsing terminal (character font information determination unit).

When there is an alternative font (YES), the processing proceeds to step S908, and the character font information of the alternative font is read. Then, in step S906, the glyph of the character font is obtained from the character font information in the browsing terminal, and the data is displayed on a displaying apparatus such as a display (not shown).

When there is no alternative font (NO), the processing proceeds to step S909. In step S909, the character image data of the alternative font is obtained from the URL (storage destination information) of the character image data (character image obtaining unit). Specifically, the character image data is downloaded from the destination of the URL described in "Alternative" of "Obj4" in FIG. 10. Then, in step S906, the data is displayed on a displaying apparatus such as a display (not shown).

With the configuration described above, even when the character font information in a browsing terminal cannot be known when structured document data is generated, structured document data having both of readability and reduced file size can be generated. In addition, even when the character font used in the electronic document data of a conversion source is not present in a terminal where structured document data is generated, if the character font is present in the browsing terminal, then structured document data capable being browsed in that character font can be generated. In addition, although the present embodiment has been described in the case of using a function included in the client terminal 100 when electronic document data is converted into structured document data, conversion may be performed by an apparatus that is different from the client terminal 100 as a document conversion apparatus, for example.

(Second Embodiment)

In the first embodiment, in step S809, a control program is stored in structured document data, but, in the second embodiment, this control program is not stored in the data. In other words, the structured document data generated by a server 110 does not include "Obj5" corresponding to the control program as shown in FIG. 11, in contrast to FIG. 10. Instead of "Obj5", the structured document processing unit 104 in a terminal for browsing a structured document (for example, the client terminal 100 in the present embodiment) includes the control program described referring to FIG. 9. Specifically, when the structured document processing unit 104 displays a structured document in step S906, it analyzes the structured document data shown in FIG. 11 and displays the structured document a manner such as that shown in FIG. 9. In addition, the other configurations are the same as ones in the first embodiment.

As described above, even when the character font information in a browsing terminal cannot be known when structured document data is generated, structured document data having both readability and a reduced file size can be generated as in the first embodiment. In addition, even when the character font used in electronic document data of a conversion source is not present in a terminal where structured document data is generated, if the character font is present in the browsing terminal, then structured document data capable being browsed in that character font can be generated.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-103204, filed May 15, 2013, which is hereby incorporated by reference herein in its entirety.

What is claimed is:

1. A document conversion apparatus comprising:
   a memory; and
   at least one processor that executes a computer program in the memory to control the document conversion apparatus to function as units comprising:
      an obtaining unit that obtains first document data described in a first file format, the first document data using first character font information; and
      a conversion unit that obtains second document data described in a second file format by converting the first document data, the second file format being different from the first file format, wherein
   the conversion unit converts the first document data into the second document data by replacing the first character font information with second character font information that is different from the first character font information if it is determined that the first character font information is not present in the document conversion apparatus,
   the second document data obtained by the conversion unit further includes hint information which indicates the first character font information being replaced with the second character font information if it is determined that the first character font information is not present in the document conversion apparatus, the second document data obtained by the conversion unit further includes a control program which is executed by a terminal which displays the second document data, the control program controls the terminal to display the second document data by replacing the second character font information with the first character font information supported by the terminal when the terminal supports the first character font information indicated by the hint information, and the control program controls the terminal to display the second document data using the second character font information when the terminal does not support the first character font information indicated by the hint information.

2. The apparatus according to claim 1, wherein the second character font information includes character width information indicating a width of a character font.

3. The apparatus according to claim 2, wherein a glyph of the second character font information is not included in the second document data.

4. The apparatus according to claim 1, wherein the control program controls the terminal to determine whether or not the terminal has a glyph of the first character font information, and it is determined that the terminal supports the first character font information in a case that the terminal has the glyph of the first character font information.

5. The apparatus according to claim 1, wherein the control program controls the terminal to determine whether or not a font face name corresponding to the first character font information is present in the terminal, and it is determined that the terminal supports the first character font information in the case that the font face name corresponding to the first character font information is present in the terminal.

6. The apparatus according to claim 5, wherein a font face name corresponding to the second font information is different from the font face name corresponding to the first font information.

7. The apparatus according to claim 1, wherein the conversion unit further generates second character image data corresponding to the second character font information to store the generated second character image data if it is determined that the first character font information is not present in the document conversion apparatus, and the second document data obtained by the conversion unit further includes information which indicates a location where the second character image data is stored.

8. The apparatus according to claim 7, wherein the location where the second character image data is stored is described with a URL.

9. The apparatus according to claim 1, wherein the conversion unit converts the first document data into the second document data using the first character font information that is present in the document conversion apparatus if it is determined that the first character font information is present in the document conversion apparatus.

10. The apparatus according to claim 9, wherein the conversion unit further generates first character image data corresponding to the first character font information that is present in the document conversion apparatus to store the generated first character image data if it is determined that the first character font information is present in the document conversion apparatus, and the second document data obtained by the conversion unit further includes information which indicates a location where the first character image data is stored.

11. A document conversion method executed by a document conversion apparatus, the method comprising:

obtaining first document data described in a first file format, the first document data using first character font information; and obtaining second document data described in a second file format by converting the first document data, the second file format being different from the first file format, wherein the first document data is converted into the second document data by replacing the first character font information with second character font information that is different from the first character font information if it is determined that the first character font information is not present in the document conversion apparatus, the obtained second document data further includes hint information which indicates the first character font information being replaced with the second character font information if it is determined that the first character font information is not present in the document conversion apparatus, the obtained second document data further includes a control program which is executed by a terminal which displays the second document data, the control program controls the terminal to display the obtained second document data by replacing the second character font information with the first character font information supported by the terminal when the terminal supports the first character font information indicated by the hint information, and the control program controls the terminal to display the obtained second document data using the second character font information when the terminal does not support the first character font information indicated by the hint information.

12. A non-transitory storage medium storing a readable program for causing a computer to execute a document conversion method, the method comprising:

obtaining first document data described in a first file format, the first document data using first character font information; and obtaining second document data described in a second file format by converting the first document data, the second file format being different from the first file format, wherein the first document data is converted into the second document data by replacing the first character font information with second character font information that is different from the first character font information if it is determined that the first character font information is not present in the document conversion apparatus, the obtained second document data further includes hint information which indicates the first character font information being replaced with the second character font information if it is determined that the first character font information is not present in the document conversion apparatus, the obtained second document data further includes a control program which is executed by a terminal which displays the second document data, the control program controls the terminal to display the obtained second document data by replacing the second character font information with the first character font information supported by the terminal when the terminal supports the first character font information indicated by the hint information, and the control program controls the terminal to display the obtained second document data using the second character font information when the terminal does not support the first character font information indicated by the hint information.

\* \* \* \* \*